Sept. 6, 1966   W. SCHWEIZER   3,270,838
CONTROL OF THE BRAKE POWER OF A HYDRODYNAMIC BRAKE
Filed Feb. 24, 1964
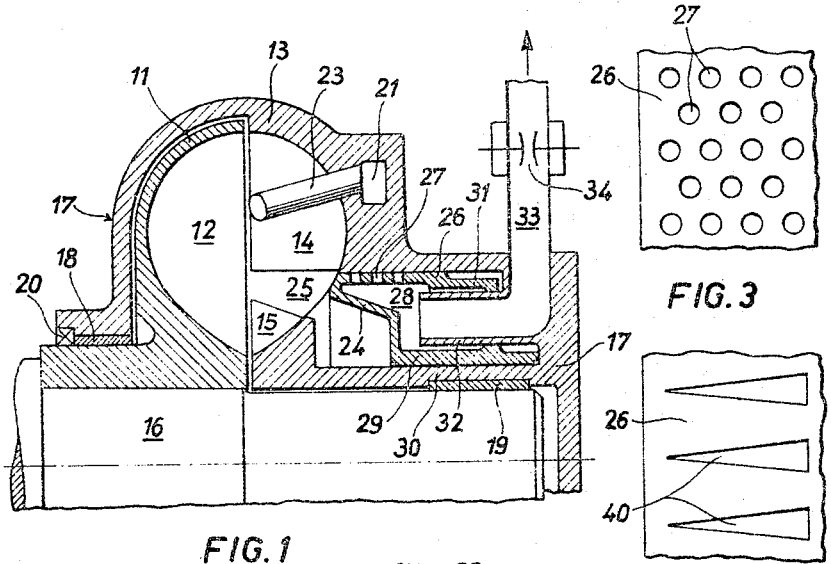
FIG.1
FIG.3
FIG.4
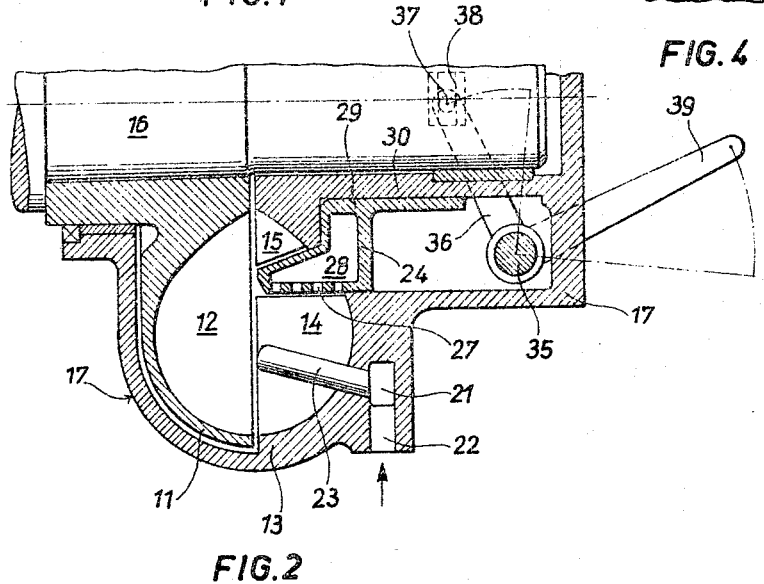
FIG.2
INVENTOR
WALTER SCHWEIZER
BY K.A. Mayr
ATTORNEY United States Patent Office 3,270,838
Patented Sept. 6, 1966

3,270,838
CONTROL OF THE BRAKE POWER OF A
HYDRODYNAMIC BRAKE
Walter Schweizer, Friedrichshafen-Manzell, Germany, assignor to Maybach-Motorenbau G.m.b.H., Friedrichshafen, Germany, a firm of Germany
Filed Feb. 24, 1964, Ser. No. 346,981
Claims priority, application Germany, Mar. 14, 1963,
M 56,105
12 Claims. (Cl. 188—90)

The present invention relates to a method of and apparatus for controlling the brake power of a hydrodynamic brake.

A hydrodynamic brake, comprising a blade rim driven by the machine to be braked and a stationary blade rim, produces a brake power which increases according to a third degree function at increasing rotational speed. The steepness of a curve indicating the brake power depends on structural features such as size of circuit described by the brake fluid, design of the blading, etc.

If a hydrodynamic brake is designed to produce a desired brake power at low speeds, undesired great brake power is produced at higher speeds.

In order to overcome the above-mentioned disadvantages and in order to be able to set different brake effects, it is known to throttle the fluid circulation in brakes with core-guiding rings, by means of an annular slide adapted to be axially slid into the circuit for the purpose of changing the cross section of the circuit between the core-guiding ring and the outer wall of the circuit.

Apart from the disadvantage that vane wheels with core-guiding rings are costly and involve large expenditures in the manufacture thereof, the cutting-off of the circulation flow by means of the annular slide—particularly when setting small brake outputs at higher speeds—will result in an irregular flow with vortex formations in the circuit which will produce irregularities in the brake power.

It is an object of the present invention to provide a control system for a hydrodynamic brake to selectively produce any desired brake effect at all speeds, thus eliminating the disadvantages and drawbacks of the brake controls known in the art.

It is a further object of this invention to provide such a control in a brake, comprising at least one stationary blade rim and one blade rim to be braked without coreguiding rings in the two blade rims, by changing the profile of the circuit chamber with an annular wall that is adapted to be slid into the stationary blade rim, and by the provision of means in the annular wall to act as a skimming device for removing fluid from the circuit.

It is another object of the invention to provide a hydrodynamic coupling with control means to change the profile of the circuit chamber, the shape and the extent of the circulation flow, and the amount of circulating fluid, while a regular flow is maintained.

Since no core-guiding rings are disposed in the blade rims and thus a complete interruption of the circulation flow is impossible, fluid is removed from the circuit for the purpose of producing small outputs at high speeds. For purposes of removing fluid, the annular wall functions as a skimming device in accordance with the present invention.

A particularly simple construction of a sensitive control is obtained in that the annular wall in the fully inserted position thereof will extend to the gap between the two blade rims and in that the outer diameter of the approximately cylindrical annular wall is smaller than the neutral core of the circuit flow.

For accurately controlling the partial filling for small outputs, an adjustable throttling device is disposed in the conduit means which will remove brake fluid from behind the skimming device.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIGURES 1 and 2 are longitudinal, central cross-sectional views of the upper and, respectively, lower half of a simple hydrodynamic brake with the annular wall in the non-inserted and, respectively, inserted position thereof, each in the end position of said annular wall;

FIGURE 3 is a plane view at an enlarged scale of a portion of the outer casing of the annular wall showing the apertures therein as being distributed in a perforated manner; and FIGURE 4 is a plane view, similar to FIGURE 3, of a portion of the outer casing of an annular wall according to the second embodiment of this invention.

Like parts are designated by like numerals in FIGS. 1 to 3.

Referring more particularly to FIGS. 1 and 2 of the drawing, numeral 11 designates a rotatable blade rim having vanes 12. Numeral 13 designates a stationary, blade rim having vanes 14 and 15 which may be arranged in any suitable direction within the wheel 13. The blade rim 13 is formed by part of the casing of the entire brake 17. The blade rim 11 is mounted on a brake shaft 16 which is driven by the shaft to be braked of a machine, of a vehicle, or the like. The brake shaft 16 is supported in bearings 18 and 19 mounted in the casing of the brake. A packing 20 prevents escape of brake fluid from the interior of the brake. An annular channel 21 is provided in the wall of the casing of the brake 17. This channel receives brake fluid from a source, not shown, through a bore 22 and discharges brake fluid into the core of the blade rims 11 and 13 through a plurality of pipes 23 which are equally distributed around the longitudinal axis of the brake.

An annular wall 24 is provided in the casing of the brake and adapted to be extended into a space 25 left in the stationary blade rim 13 between the vanes 14 and 15 for changing the profile of the circuit chamber. The annular wall 24 is also suitable for removing fluid from the brake. To this end the annular wall 24 is hollow and has an approximately cylindrical outer wall portion 26 which is provided with a plurality of apertures 27 for permitting flow from the stationary blade rim 13 into the interior 28 of the annular wall 24. The apertures 27 are distributed over the entire circumference of the cylindrical wall portion 26.

The annular wall 24 has an approximately cylindrical inner wall portion 29 which is axially slidable on a tubular portion 30 of the casing of the brake. The interior 28 of the annular wall 24 is telescopically connected, at 31, to a poriton 32 of a conduit 33 through which brake fluid can be removed from the interior of the annular wall 24, and, consequently, from the blade rim. An adjustable valve or throttling means 34 is provided in the conduit 33 for regulating the amount of fluid removed from the brake.

A shaft 35 supported in the casing of the brake carries a fork 36. The ends 37 of the prongs of the fork are slidable in guides 38 which are connected to or form part of the portion 29 of the annular wall 24. The shaft 35 can be rotated by means of a lever 39 extending to the outside of the brake casing. Counterclockwise swinging of the lever 39 causes movement of the annular wall 24 into the stationary blade rim 13 and into the extreme position shown in FIG. 2. Clockwise movement of the lever 39 causes withdrawal of the annular wall 24 from the stationary blade rim 13 into the position shown in FIG. 1.

For braking, brake fluid is supplied through the channels 22 and 21 and is filled into the blade rims 11 and 13 through the pipes 23. By moving the annular wall 24 into the blade rim 13 the circuit of the fluid is disturbed and the brake effect can be controlled within certain limits. When the brake blade rims are completely filled, the brake effect increases rapidly at increasing rotational speed of the blade rim 11. However, by adjustment of the position of the annular wall 24 the brake effect can be maintained within desired limits over a wide speed range of the blade rim 11. For additional control of the brake power, particular for effecting little brake effects at the medium and higher speeds of the blade rim 11, the amount of brake fluid contained in the brake is changed. Since the brake effect at high speeds can be substantially reduced by adjusting the position of the annular wall 24 little change of the amount of fluid contained in the brake results only in a little change of the brake effect. For example, by continuously supplying brake fluid to the brake at a substantially constant rate and adjusting the valve 34 in the fluid discharge conduit 33 accurate control of the brake can be effected. The arrangement according to the invention permits obtaining any brake effect at a wide range of speed of the rotating part of the brake.

According to the invention the annular wall 24 is not only suitable for affecting the fluid circuit within the brake, but is also suitable for changing the amount of brake fluid contained in the brake. When the annular wall 24 extends into the stationary blade rim 13 the brake fluid is dammed at the cylindrical outer wall 26 of the annular wall 24 and brake fluid is pressed through the apertures 27 into the interior 28 of the annular wall 24. This brake fluid flows through the conduit 32, 33 and its rate of flow can be adjusted by manipulating the valve 34.

The sensitive characteristics of the brake according to the invention make it particularly suitable for braking vehicles, particularly motorized rail vehicles which require constant brake horsepower within a wide speed range. With the arrangement according to the invention the brake power can be maintained constant within up to three quarters of the maximum rotational speed of the brake shaft when the brake is completely filled with fluid solely by axially moving the annular wall 24. At higher speeds up to a maximum speed the brake power can be maintained constant by changing the amount of fluid within the brake.

In a modification of the invention removal of fluid from the brake is controlled by a special configuration of the apertures in the outer wall 26 of the annular wall 24. Rectangular slots or, as shown in FIG. 4, oblong triangular openings 40 placed in the axial direction of the annular wall 24 may be provided. In this way each change of position of the annular wall 24 effects a different predetermined change of flow area.

To comply with special requirements with respect to brake characteristic two or more hydrodynamic brakes of equal or different sizes may be combined whereby the brake fluid circuits are either simultaneously or consecutively activated and regulated.

I claim:
1. A core-less hydrodynamic brake comprising:
   a stationary blade rim without a center guide core;
   a movable blade rim to be braked without a center guide core;
   said blade rims defining an annular fluid exchange gap therebetween and a fluid circuit chamber unobstructed in the direction transverse to said gap due to the absence of a center guide core;
   fluid within said chamber; and
   annular wall means operable to control the moment of the brake by moving into said stationary blade rim to change the profile of the circuit chamber including the location of the neutral fluid core formed by the circulation of said fluid within said chamber and to remove said fluid from the circuit.

2. The hydrodynamic brake of claim 1 including, adjustable throttle means for controlling the removal of said fluid by said annular wall means and wherein said stationary blade rim is split to form two annular rim portions defining an annular passage between them, said annular wall means is mounted to move within the annular passage substantially transverse to the fluid exchange gap, and said annular wall means is hollow and includes an outer casing having apertures therein for removing said fluid.

3. The hydrodynamic brake of claim 1 wherein, said annular wall means, in its fully inserted position, extends to said gap between said blade rims.

4. The hydrodynamic brake of claim 3 including adjustable throttle means for controlling the removal of said fluid by said annular wall means and wherein said stationary blade rim is split to form two annular rim portions defining an annular passage between them, said annular wall means is mounted to move within the annular passage substantially transverse to the fluid exchange gap, and said annular wall means is hollow and includes an outer casing having apertures therein for removing said fluid.

5. The hydrodynamic brake of claim 3 wherein, said annular wall means is hollow and includes an outer casing having apertures therein for removing said fluid.

6. The hydrodynamic brake of claim 5 wherein, the total cross-sectional area of said apertures, effective for removing fluid, changes as said annular wall is moved into said stationary blade rim, for changing the filling.

7. The hydrodynamic brake of claim 1 wherein, the outer diameter of said annular wall means is smaller than the diameter of the neutral core formed by the circulation of said fluid within said chamber.

8. The hydrodynamic brake of claim 7 including, adjustable throttling means for controlling the removal of said fluid by said annular wall means and wherein said stationary blade rim is split to form two annular rim portions defining an annular passage between them, said annular wall means is mounted to move within the annular passage substantially transverse to the fluid exchange gap, and said annular wall means is hollow and includes an outer casing having apertures therein for removing said fluid.

9. The hydrodynamic brake of claim 7 wherein, said annular wall means is hollow and includes an outer casing having apertures therein for removing said fluid.

10. The hydrodynamic brake of claim 9 wherein, the total cross-sectional area of said apertures, effective for removing fluid, changes as said annular wall is moved into said stationary blade rim, for changing the filling.

11. The hydrodynamic brake of claim 1 wherein, said annular wall means is hollow and includes an outer casing having apertures therein for removing said fluid.

12. The hydrodynamic brake of claim 11, wherein the total cross-sectional area of said apertures, effective for removing fluid, changes as said annular wall is moved into said stationary blade rim, for changing the filling.

References Cited by the Examiner

UNITED STATES PATENTS

| | | | |
|---|---|---|---|
| 984,849 | 2/1911 | Radcliffe | 188—90 |
| 1,149,938 | 8/1915 | Nagelvoort | 188—90 |
| 1,685,735 | 9/1928 | Walker | 188—90 |
| 2,737,276 | 3/1956 | Wyndham | 188—90 X |
| 2,987,887 | 6/1961 | Fowler | 60—54 |

FOREIGN PATENTS 423,510  7/1947  Italy.

MILTON BUCHLER, *Primary Examiner.*

G. E. A. HALVOSA, *Assistant Examiner.*